US009834080B2

(12) United States Patent
Ahn et al.

(10) Patent No.: US 9,834,080 B2
(45) Date of Patent: Dec. 5, 2017

(54) TRANSMISSION STRUCTURE OF HEV (71) Applicant: Hyundai Motor Company, Seoul (KR)

(72) Inventors: Chul Min Ahn, Busan (KR); Seok Joon Kim, Yongin-si (KR); Jun Young Ha, Ulsan (KR); Baek Yu Kim, Suwon-si (KR); Sung Gon Byun, Anyang-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/741,067

(22) Filed: Jun. 16, 2015

(65) Prior Publication Data
US 2016/0101680 A1    Apr. 14, 2016

(30) Foreign Application Priority Data
Oct. 13, 2014   (KR) .................. 10-2014-0137477

(51) Int. Cl.
| B60K 6/383 | (2007.10) |
| F16H 3/10 | (2006.01) |
| B60K 6/365 | (2007.10) |
| B60K 6/387 | (2007.10) |
| B60K 6/445 | (2007.10) |
| B60K 6/52 | (2007.10) |
| B60K 6/38 | (2007.10) |

(52) U.S. Cl.
CPC .............. B60K 6/365 (2013.01); B60K 6/383 (2013.01); B60K 6/387 (2013.01); B60K 6/445 (2013.01); B60K 6/52 (2013.01); B60K 2006/381 (2013.01); B60Y 2200/92 (2013.01); Y02T 10/6239 (2013.01); Y02T 10/6265 (2013.01); Y10S 903/91 (2013.01); Y10S 903/913 (2013.01); Y10S 903/914 (2013.01)

(58) Field of Classification Search
CPC ................... F16H 2037/101; B60K 2006/381
See application file for complete search history.

(56) References Cited

U.S. PATENT DOCUMENTS

| 6,524,217 | B1 * | 2/2003 | Murakami ............. B60K 6/365 180/65.225 |
| 2004/0134698 | A1 | 7/2004 | Yamamoto et al. |
| 2004/0166980 | A1 * | 8/2004 | Supina .................... B60K 6/40 475/5 |
| 2008/0302590 | A1 | 12/2008 | Sato |
| 2010/0133042 | A1 | 6/2010 | Ikeda et al. |
| 2011/0111908 | A1 | 5/2011 | Kim et al. |

(Continued)

FOREIGN PATENT DOCUMENTS

| JP | 2004-208477 A | 7/2004 |
| JP | 2008-302892 A | 12/2008 |

(Continued)

Primary Examiner — Ramya Burgess
Assistant Examiner — Lillian Nguyen
(74) Attorney, Agent, or Firm — Morgan, Lewis & Bockius LLP (57) ABSTRACT A transmission structure of a hybrid electric vehicle (HEV) may include an engine connected to a front wheel of the hybrid vehicle, a planetary gear part connected to the engine, a first motor generator connected to the planetary gear part, an overdrive brake connected to the first motor generator, and a second motor generator connected to a rear wheel of the hybrid vehicle.

10 Claims, 10 Drawing Sheets (56) References Cited

U.S. PATENT DOCUMENTS

| | | | |
|---|---|---|---|
| 2012/0065014 A1* | 3/2012 | Puiu | B60K 6/445 475/5 |
| 2014/0162824 A1 | 6/2014 | Choi et al. | |
| 2014/0371964 A1* | 12/2014 | Kitahata | B60K 6/445 701/22 |
| 2015/0072819 A1* | 3/2015 | Ono | B60K 6/365 475/5 |
| 2015/0167808 A1* | 6/2015 | Kim | B60K 6/365 475/5 |
| 2015/0224983 A1* | 8/2015 | Hiasa | B60K 6/365 475/2 |

FOREIGN PATENT DOCUMENTS

| | | |
|---|---|---|
| KR | 10-0559760 B1 | 3/2006 |
| KR | 10-2007-0084657 A | 8/2007 |
| KR | 10-2010-0060993 A | 6/2010 |
| KR | 10-0986564 B1 | 10/2010 |
| KR | 10-2011-0052144 A | 5/2011 |
| KR | 10-2014-0080638 A | 7/2014 |

\* cited by examiner

FIG. 1

FRONT WHEEL(REAR WHEEL)   REAR WHEEL(FRONT WHEEL)

FIG. 2

FRONT WHEEL(REAR WHEEL)   REAR WHEEL(FRONT WHEEL)

FIG. 3

FRONT WHEEL(REAR WHEEL)        REAR WHEEL(FRONT WHEEL)

FIG. 4

FRONT WHEEL(REAR WHEEL)        REAR WHEEL(FRONT WHEEL)

——— SECOND MOTOR GENERATOR Power
——— ENGINE Power
------- FIRST MOTOR GENERATOR Power

FIG. 13 ent application claims priority to Korean Patent Application No. 10-2014-0137477, filed Oct. 13, 2014, the entire contents of which is incorporated herein for all purposes by this reference.

BACKGROUND OF THE INVENTION

Field of the Invention

The present invention relates to a transmission structure of a hybrid electric vehicle (HEV), and more particularly, to a transmission structure of an HEV for improving fuel efficiency by allowing a power split driving and a parallel driving in the hybrid vehicle and for allowing a driving mode to be switched depending on various driving situations.

Description of Related Art

In general, a hybrid vehicle, which is a vehicle driven by a combination of electrical power and a power source of an internal combustion engine, is controlled so as to be operated at a point of high efficiency of a system by a gasoline engine and an electrical motor to thereby efficiently reduce exhaust gas while having excellent efficiency.

In addition, since the hybrid vehicle does not need to build a separate charging facility such as an electric vehicle and may improve fuel efficiency and secure the same driving distance as that of an existing gasoline vehicle, it is expected to form a key point of the future of an eco-friendly car.

In this case, a power branch method of the hybrid vehicle includes a mechanical flow in which power of the engine is directly transferred to an output shaft using a power branch apparatus that branches a power flow such as planetary gear and an electrical flow in which a generator is driven using the power of the engine. In this case, a battery is charged with the generated power or a motor is driven by energy of the charged battery.

However, hybrid vehicles according to the related art have decreased efficiency upon driving, which results in deterioration of fuel efficiency.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a transmission structure of a hybrid electric vehicle (HEV), and more particularly, a transmission structure of an HEV for improving fuel efficiency by allowing a power split driving and a parallel driving in the hybrid electric vehicle and for allowing a driving mode to be switched depending on a situation.

A transmission structure of a hybrid electric vehicle (HEV) may include an engine connected to a front wheel of the hybrid vehicle, a planetary gear part connected to the engine, a first motor generator connected to the planetary gear part, an overdrive brake connected to the first motor generator, and a second motor generator connected to a rear wheel of the hybrid vehicle.

A synchro may be provided in a path through which power of the engine and the first motor generator may be discharged.

The planetary gear part may include a ring gear, a carrier, and a sun gear.

The path through which the power of the engine and the first motor generator is discharged may be formed by the ring gear, an output shaft, and a differential gear.

The carrier may be connected to the engine and the sun gear may be connected to the first motor generator.

The torque blocking part may be provided to a shaft connecting the engine and the carrier to each other.

The torque blocking part may include one of a one-way clutch, a two-way clutch, or a brake.

According to various aspects of the present invention, a transmission structure of a hybrid electric vehicle (HEV) may include an engine connected to a front wheel of the hybrid vehicle, a planetary gear part configured to be connected to the engine and include a carrier, a sun gear, and a ring gear, a first motor generator configured to be connected to the planetary gear part, an overdrive brake configured to be connected to the first motor generator, a second motor generator configured to be connected to a rear wheel of the hybrid vehicle, an output synchro configured to be provided in a path through which power of the engine and the first motor generator may be discharged, and a ring gear synchro configured to fix the ring gear and be connected to the output synchro.

According to various aspects of the present invention, a transmission structure of a hybrid electric vehicle (HEV) may include an engine connected to a rear wheel of the hybrid vehicle, a planetary gear part connected to the engine and including a carrier, a sun gear, and a ring gear, a first motor generator connected to the planetary gear part, an overdrive brake connected to the first motor generator, a second motor generator connected to a front wheel of the hybrid vehicle, an output synchro provided in a path through which power of the engine and the first motor generator may be discharged, and a ring gear synchro fixing the ring gear and connected to the output synchro.

According to various aspects of the present invention, a transmission structure of a hybrid electric vehicle (HEV) may include an engine connected to a rear wheel of the hybrid vehicle, a planetary gear part connected to the engine, a first motor generator connected to the planetary gear part, an overdrive brake connected to the first motor generator, and a second motor generator connected to a front wheel of the hybrid vehicle.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

A transmission structure of a hybrid electric vehicle (HEV) according to various embodiments of the present invention includes an engine 10 connected to a front wheel or a rear wheel, a planetary gear part 20, a first motor generator 30, an overdrive brake 40, and a second motor generator 50 connected to a front wheel or a rear wheel that is not connected to the engine 10, as shown in FIG. 1 to FIG. 6.

Figure 1:
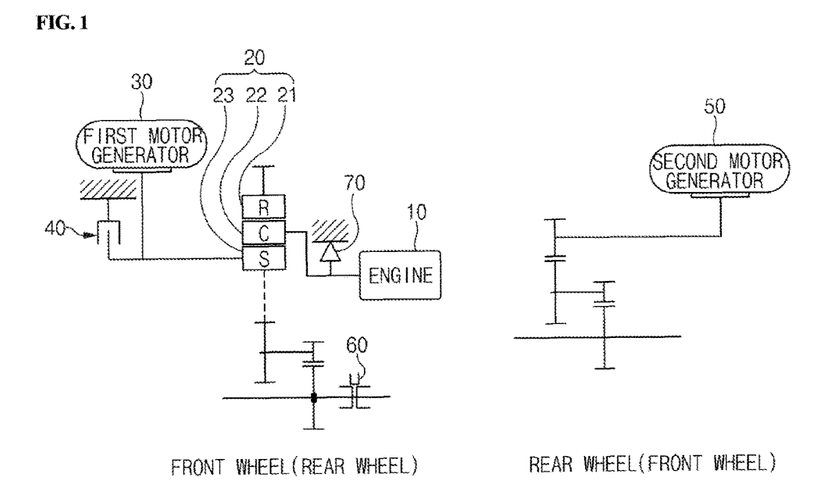
FIG. 1, FIG. 2 and FIG. 3 are structural views showing an exemplary transmission structure of a hybrid electric vehicle (HEV) according to the present invention.
Figure 2:
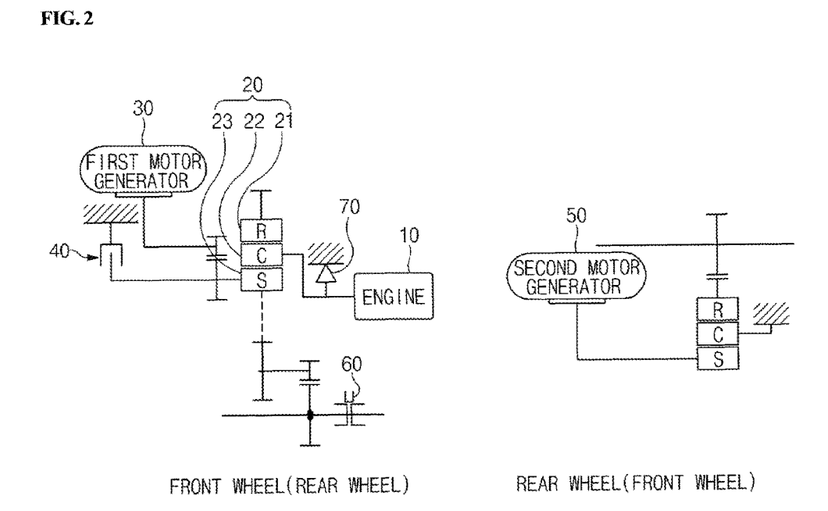
Figure 3:
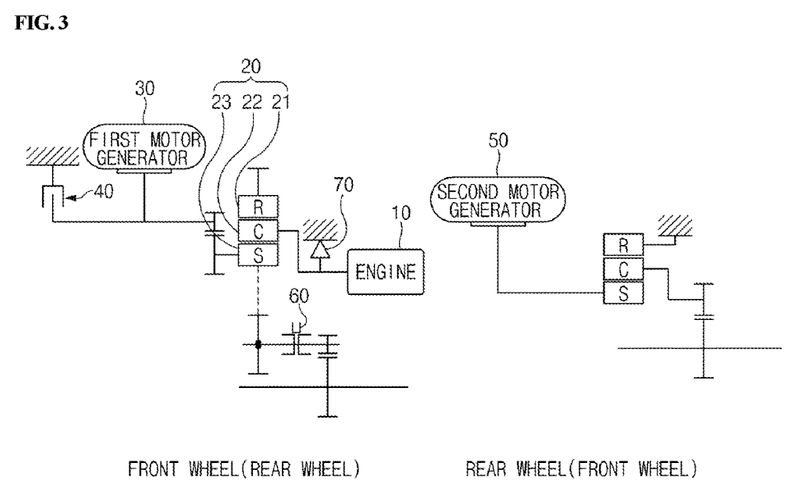

First, the present invention relates to a technology for allowing a power spilt mode and a parallel mode of the transmission of the HEV to be simultaneously driven, in which the engine 10, the planetary gear part 20, the first motor generator 30, and the overdrive brake 40 are disposed at any one of the front wheel and the rear wheel of the vehicle so as to be connected to each other.

As shown in FIG. 1 to FIG. 3, in the case in which the engine 10 is connected to the front wheel of the hybrid vehicle, the planetary gear part 20, the first motor generator 30, and the overdrive brake 40 are also disposed at the front wheel, and in the case in which the engine 10 is connected to the rear wheel, the planetary gear part 20, the first motor generator 30, and the overdrive brake 40 are also disposed at the rear wheel.

In this case, the planetary gear part 20 is connected to the engine 10 and the first motor generator 30 is connected to the planetary gear part 20.

In addition, the overdrive brake 40 is connected to the first motor generator 30 to allow an overdrive mode.

Meanwhile, the planetary gear part 20 includes a ring gear 21, a carrier 22, and a sun gear 23.

In addition, a synchro 60 is provided to a path through which power of the engine 10 and the first motor generator 30 is discharged, which allows the power to be blocked in some cases.

Figure 4:
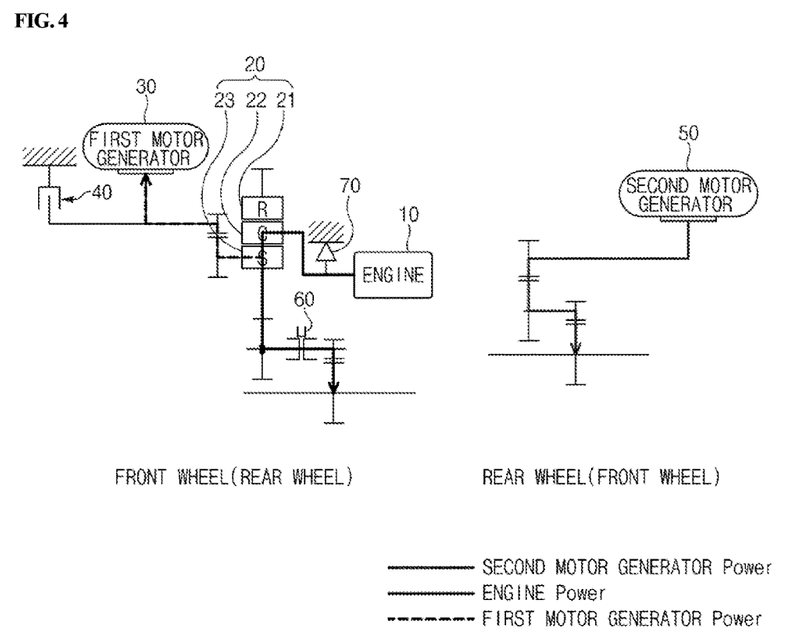
FIG. 4 is a structural view showing a power split mode of the exemplary transmission structure of the HEV according to the present invention.
Figure 5:
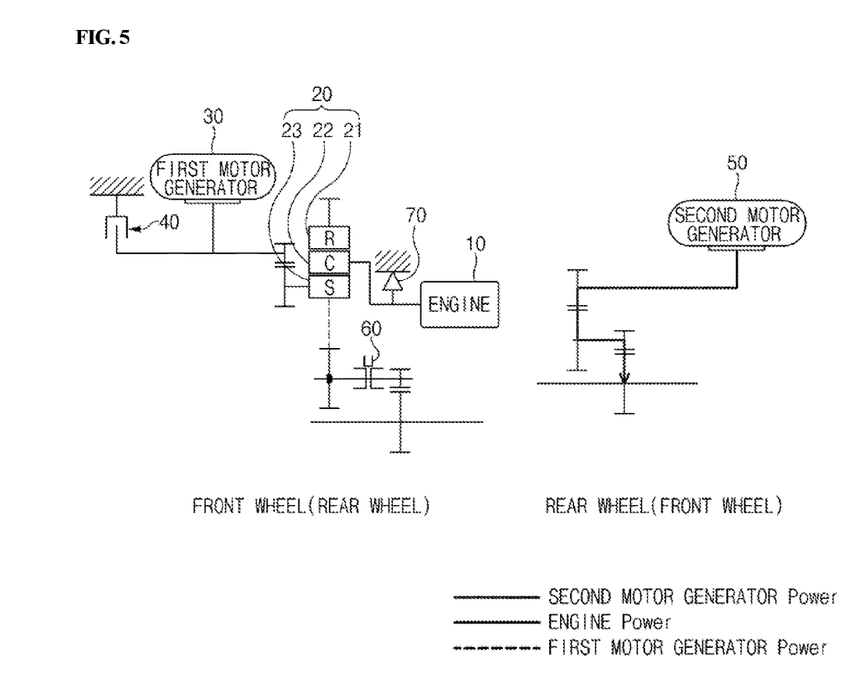
FIG. 5 is a structural view showing an EV mode of the exemplary transmission structure of the HEV according to the present invention.
Figure 6:
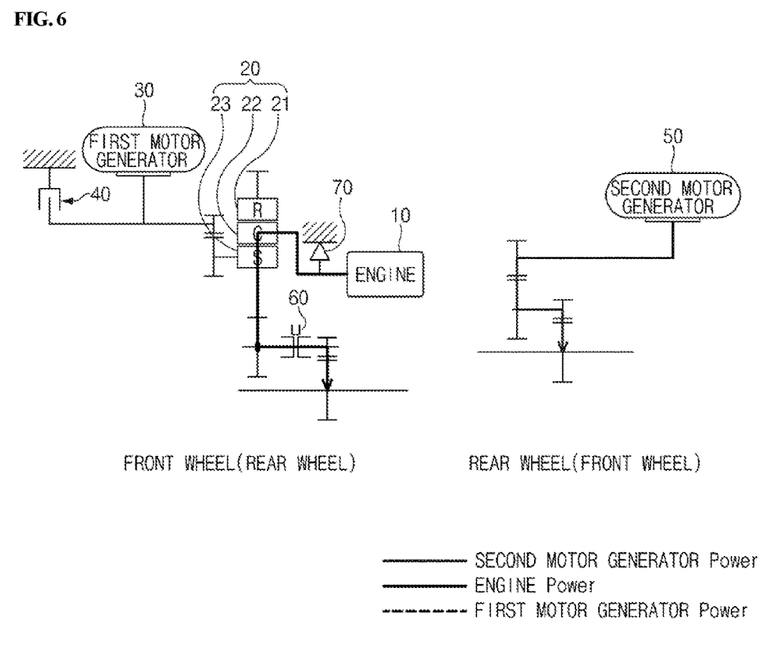
FIG. 6 is a structural view showing of an engine direct-coupled mode of the exemplary transmission structure of the HEV according to the present invention.

That is, a power split mode in which the synchro 60 is coupled forms a structure as shown in FIG. 4, an EV mode in which the synchro 60 is released forms a structure as shown in FIG. 5, and an engine direct-coupled mode in which the synchro 60 is coupled to allow the overdrive brake 40 to be operated forms a structure as shown in FIG. 6.

In addition, the path through the power of the engine 10 and the first motor generator 30 is discharged may be formed by the ring gear 21, an output shaft, and a differential gear.

Meanwhile, the carrier 22 may be connected to the engine 10 and the sun gear 23 may be connected to the first motor generator 30, so as to implement an electronic continuously variable transmission (e-CVT) mode.

In this case, a torque blocking part 70 is provided to a shaft connecting the engine 10 and the carrier 22 to each other, such that torque applied to the engine 10 when the engine 10 is not operated may be blocked.

Meanwhile, as the torque blocking part 70, one of one-way clutch, a two-way clutch, and a brake is mounted.

The second motor generator 50 is connected to the rear wheel in the case in which the engine 10 is connected to the front wheel of the vehicle, and is connected to the front wheel in the case in which the engine 10 is connected to the rear wheel of the vehicle.

In this case, the second motor generator 50 is connected to the output shaft due to a deceleration structure, wherein the deceleration structure forms a deceleration ratio by an external gear.

Meanwhile, according to the present invention, in order to prevent interference occurring when the engine 10 is disposed at the front wheel and the motor is disposed at the front wheel, the engine 10 may be disposed so as to be connected to the carrier 22 by the external gear in some cases.

As described above, the transmission structure of the HEV according to the present invention includes the engine 10 connected to the front wheel or the rear wheel, the planetary gear part 20, the first motor generator 30, the overdrive brake 40, and the second motor generator 50 connected to the front wheel or the rear wheel that is not connected to the engine 10, thereby making it possible to improve fuel efficiency and allow a small hybrid vehicle to be developed by reducing a size of a system while simultaneously maintaining the power split structure and the parallel structure which are a high fuel efficiency system.

In addition, when the vehicle is being driven, a PHEV may perform an EV rear wheel driving and an engine 10 front wheel driving and an HEV may perform an EV front wheel driving and an engine 10 rear wheel driving so as to form a rear wheel-centered system, thereby improving drivability, and in a bad weather condition due to snow or rain, the PHEV may perform the EV front wheel driving and the engine 10 rear wheel driving and the HEV may perform the EV rear wheel driving and the engine 10 front wheel driving, thereby making it possible to implement the driving capable of improving safety.

Various embodiments of the present invention will further be described in detail with reference to the accompanying drawings.

A transmission structure of a hybrid electric vehicle (HEV) according to various embodiments of the present invention includes an engine 10 connected to a front wheel or a rear wheel, a planetary gear part 20 including a carrier 22, a sun gear 23, and a ring gear 21, a first motor generator 30, an overdrive brake 40, a second motor generator 50 connected to a front wheel or a rear wheel that is not connected to the engine 10, an output synchro 80 provided in a path through which power is discharged, and a ring gear synchro 90 fixing the ring gear 21, as shown in FIG. 7 to FIG. 13.

Figure 7:
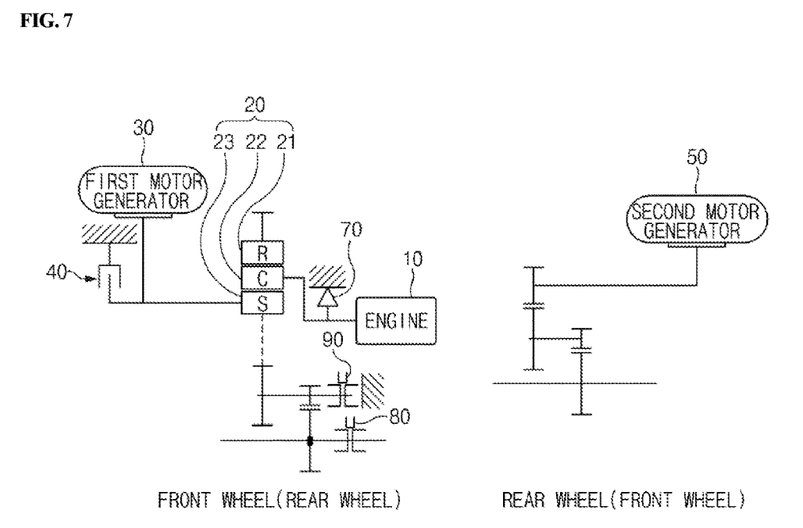
FIG. 7, FIG. 8 and FIG. 9 are structural views showing an exemplary transmission structure of a hybrid electric vehicle (HEV) according to the present invention.
Figure 8:
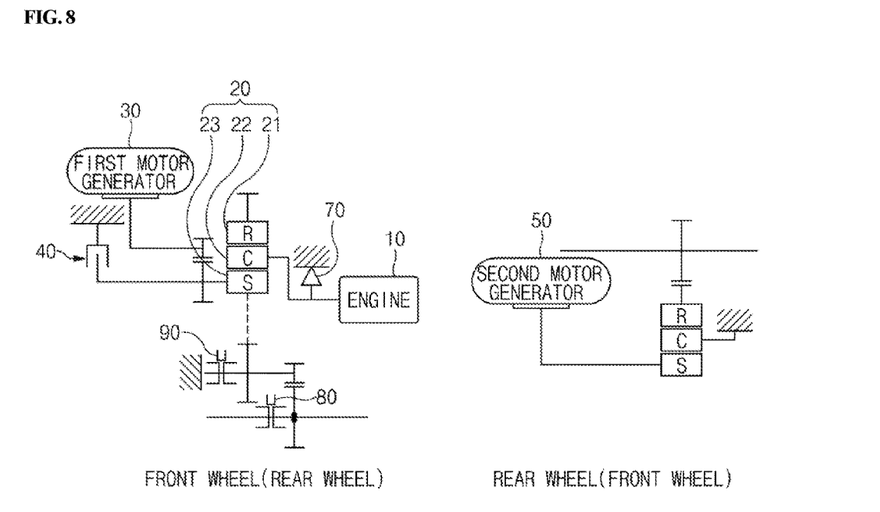
Figure 9:
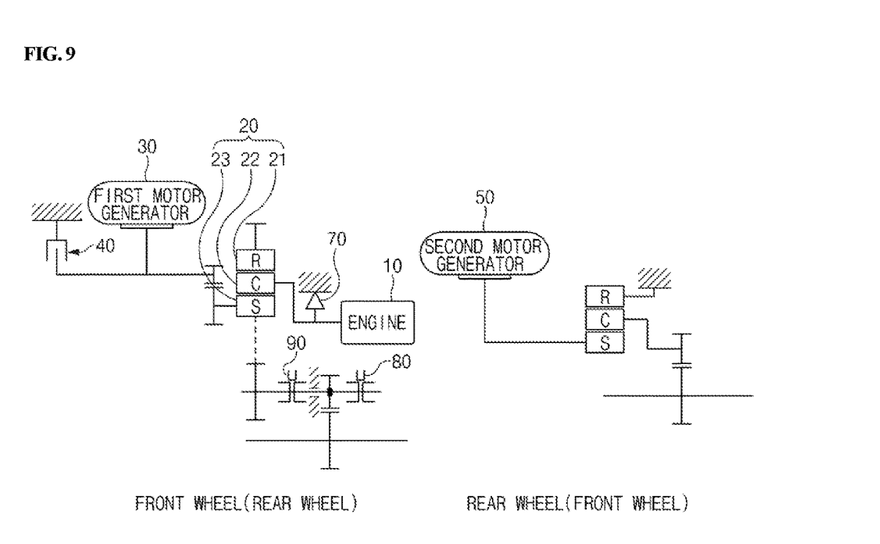

First, the present invention relates to a technology for allowing a power spilt mode, a parallel mode, and a series mode of the transmission of the HEV to be simultaneously driven, wherein the engine 10, the planetary gear part 20, the first motor generator 30, and the overdrive brake 40 are disposed at any one of the front wheel and the rear wheel of the vehicle so as to be connected to each other.

As shown in FIG. 7 to FIG. 9, in the case in which the engine 10 is connected to the front wheel of the hybrid vehicle, the planetary gear part 20, the first motor generator 30, and the overdrive brake 40 are also disposed at the front wheel, and in the case in which the engine 10 is connected to the rear wheel, the planetary gear part 20, the first motor generator 30, and the overdrive brake 40 are also disposed at the rear wheel.

In this case, the planetary gear part 20 is connected to the engine 10 and the first motor generator 30 is connected to the planetary gear part 20.

In addition, the overdrive brake 40 is connected to the first motor generator 30 to allow an overdrive mode.

Meanwhile, the planetary gear part 20 includes a ring gear 21, a carrier 22, and a sun gear 23.

In addition, the output synchro 80 is provided to a path through which power of the engine 10 and the first motor generator 30 is discharged, which allows the power to be blocked in some cases.

In addition, the ring gear synchro 90 fixes the ring gear 21 of the planetary gear part 20 and is connected to the output synchro 80 to allow the series mode to be implemented.

In this case, since the ring gear synchro 90 and the output synchro 80 are simultaneously coupled to each other, a synchro fork sleeve may be shared.

Figure 10:
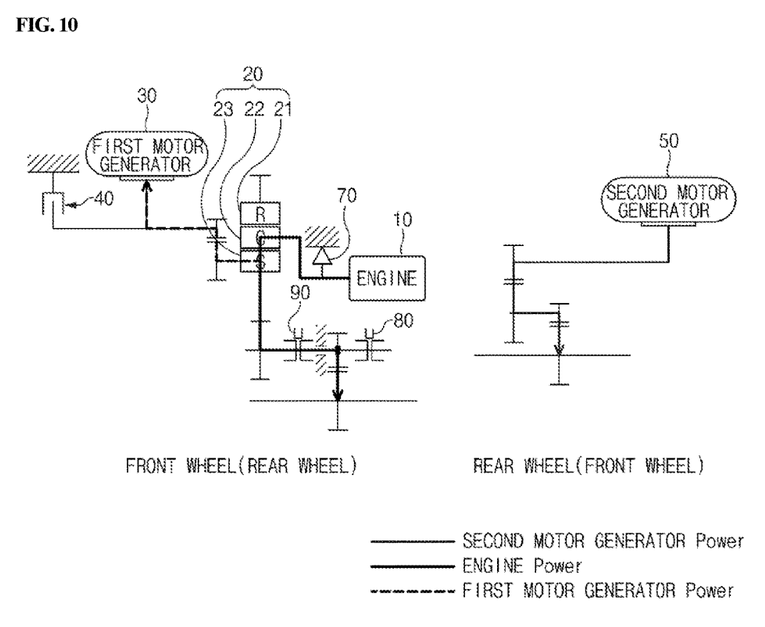
FIG. 10 is a structural view showing a power split mode of the exemplary transmission structure of the HEV of FIG. 7, FIG. 8 and FIG. 9, according to the present invention.
Figure 11:
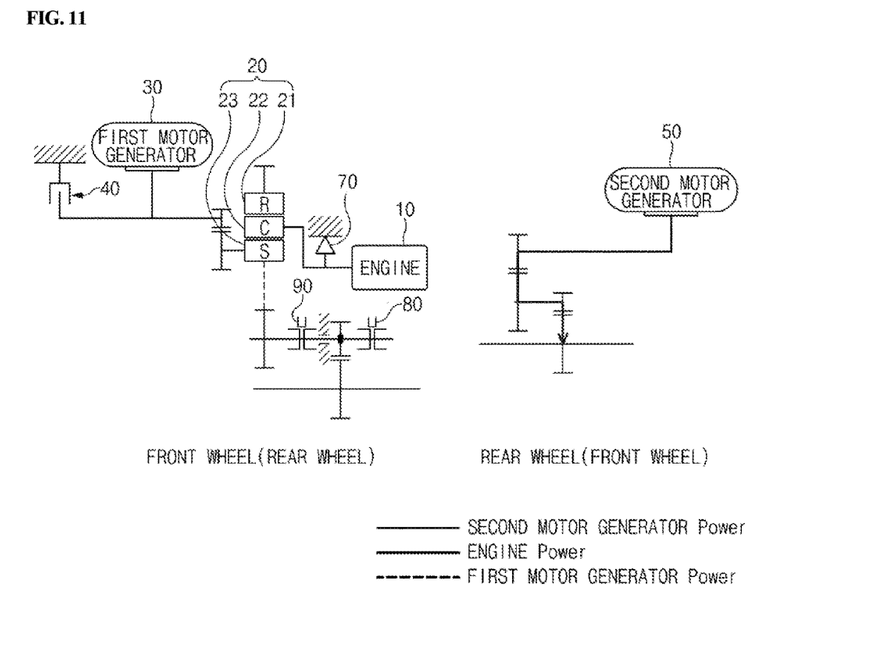
FIG. 11 is a structural view showing an EV mode of the exemplary transmission structure of the HEV of FIG. 7, FIG. 8 and FIG. 9, according to the present invention.
Figure 12:
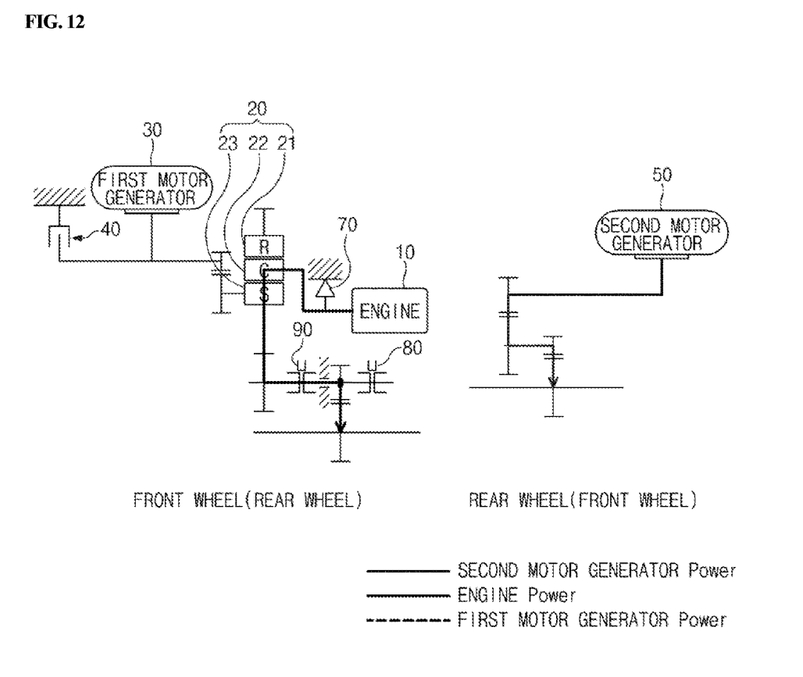
FIG. 12 is a structural view showing an engine direct-coupled mode of the transmission structure of the HEV of FIG. 7, FIG. 8 and FIG. 9, according to the present invention.
Figure 13:
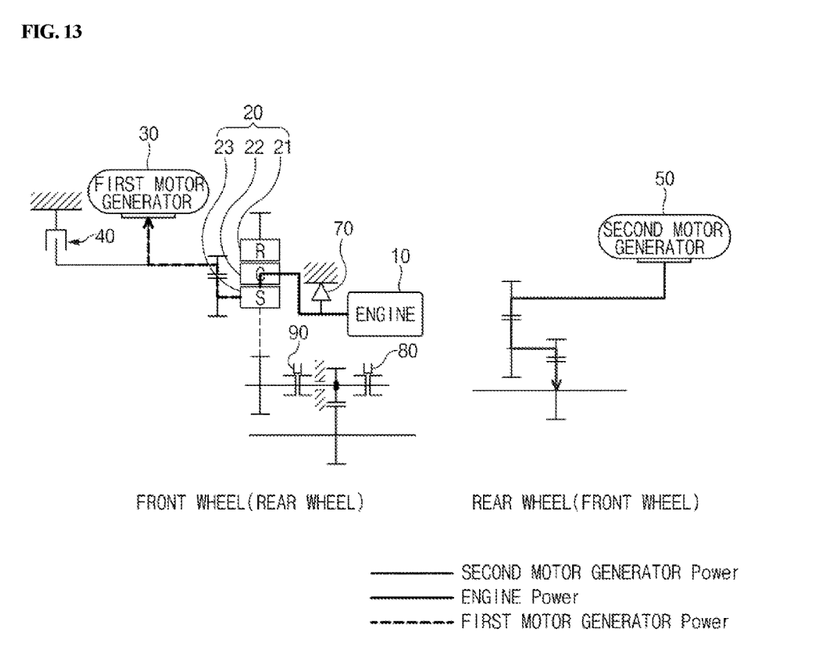
FIG. 13 is a structural view showing of a series mode of the exemplary transmission structure of the HEV of FIG. 7, FIG. 8 and FIG. 9, according to the present invention.

That is, a power split mode in which the output synchro 80 is coupled and the ring gear synchro 90 is released forms a structure as shown in FIG. 10, an EV mode in which the output synchro 80 is released and the ring gear synchro 90 is operated forms a structure as shown in FIG. 11, an engine direct-coupled mode in which the output synchro 80 is coupled, the ring gear synchro 90 is released and the overdrive brake 40 is operated forms a structure as shown in FIG. 12, and a series mode in which the output synchro 80 is released, the ring gear synchro 90 is operated and the overdrive brake 40 is released forms a structure as shown in FIG. 13.

Meanwhile, the path through the power of the engine 10 and the first motor generator 30 is discharged may be formed by the ring gear 21, an output shaft, and a differential gear.

In this case, the carrier 22 may be connected to the engine 10 and the sun gear 23 may be connected to the first motor generator 30, so as to implement an e-CVT mode.

In addition, a torque blocking part 70 is provided to a shaft connecting the engine 10 and the carrier 22 to each other, such that torque applied to the engine 10 when the engine 10 is not operated may be blocked.

Meanwhile, as the torque blocking part 70, one of one-way clutch, a two-way clutch, and a brake is mounted.

The second motor generator 50 is connected to the rear wheel in the case in which the engine 10 is connected to the front wheel of the vehicle, and is connected to the front wheel in the case in which the engine 10 is connected to the rear wheel of the vehicle.

In this case, the second motor generator 50 is connected to the output shaft due to a deceleration structure, wherein the deceleration structure forms a deceleration ratio by an external gear.

Meanwhile, according to the present invention, in order to prevent interference occurring when the engine 10 is disposed at the front wheel and the motor is disposed at the front wheel, the engine 10 may be disposed so as to be connected to the carrier 22 by the external gear in some cases.

As described above, the transmission structure of the HEV according to the present invention includes the engine 10 connected to the front wheel or the rear wheel, the planetary gear part 20, the first motor generator 30, the overdrive brake 40, the second motor generator 50 connected to the front wheel or the rear wheel that is not connected to the engine 10, the output synchro 80 provided in the path through which the power is discharged, and the ring gear synchro 90 fixing the ring gear 21, thereby making it possible to improve fuel efficiency and allow a small hybrid vehicle to be developed by reducing a size of a system while simultaneously maintaining the power split structure, the parallel structure, the series structure which are a high fuel efficiency system.

In addition, when the vehicle is being driven, a PHEV may perform an EV rear wheel driving and an engine 10 front wheel driving and an HEV may perform an EV front wheel driving and an engine 10 rear wheel driving so as to form a rear wheel-centered system, thereby improving drivability, and in a bad weather condition due to snow or rain, the PHEV may perform the EV front wheel driving and the engine 10 rear wheel driving and the HEV may perform the EV rear wheel driving and the engine 10 front wheel driving, thereby making it possible to implement the driving capable of improving safety.

As described above, according to the various embodiments of the present invention, the fuel efficiency may improved and the development of the small hybrid vehicle may be implemented by reducing the size of the system while simultaneously maintaining the power split structure and the parallel structure which are the high fuel efficiency system. At the same time, the PHEV may perform the EV rear wheel driving and the engine front wheel driving, and the HEV may perform the EV front wheel driving and the engine rear wheel driving so as to form the rear wheel-centered system, thereby improving drivability. In addition, in the bad weather condition due to snow or rain, the PHEV may perform the EV front wheel driving and the engine rear wheel driving and the HEV may perform the EV rear wheel driving and the engine front wheel driving, thereby making it possible to implement the driving capable of improving safety.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A transmission structure of a hybrid electric vehicle (HEV), the transmission structure comprising:
    an engine connected to a front wheel of the hybrid electric vehicle;
    a planetary gear part connected to the engine;
    a first motor generator connected to the planetary gear part;
    an overdrive brake connected to the first motor generator; and
    a second motor generator connected to a rear wheel of the hybrid electric vehicle,
    wherein when an overdrive is in operation, only the engine is output through the planetary gear part,
    wherein an output synchro is provided in a path through which power of the engine and the first motor generator is discharged,
    wherein the planetary gear part includes a ring gear, a carrier, and a sun gear, and
    wherein the path through which the power of the engine and the first motor generator is discharged is formed by the ring gear, and an output shaft.

2. The transmission structure according to claim 1, wherein the carrier is connected to the engine and the sun gear is connected to the first motor generator.

3. The transmission structure according to claim 1, wherein a torque blocking part is provided to a shaft connecting the engine and the carrier to each other.

4. The transmission structure according to claim 3, wherein the torque blocking part comprises one of a one-way clutch, a two-way clutch, or a brake.

5. The transmission structure according to claim 1, the transmission structure comprising:
    a ring gear synchro fixing the ring gear and connected to the output synchro,
    wherein when the overdrive is in operation, only the engine is output through the planetary gear part.

6. A transmission structure of a hybrid electric vehicle (HEV), the transmission structure comprising:
    an engine connected to a rear wheel of the hybrid electric vehicle;
    a planetary gear part connected to the engine;
    a first motor generator connected to the planetary gear part;
    an overdrive brake connected to the first motor generator; and
    a second motor generator connected to a front wheel of the hybrid electric vehicle,
    wherein when an overdrive is in operation, only the engine is output through the planetary gear part,
    wherein an output synchro is provided in a path through which power of the engine and the first motor generator is discharged,
    wherein the planetary gear part includes a ring gear, a carrier, and a sun gear, and
    wherein the path through which the power of the engine and the first motor generator is discharged is formed by the ring gear, and an output shaft.

7. The transmission structure according to claim 6, the transmission structure comprising:
    a ring gear synchro fixing the ring gear and connected to the output synchro.

8. The transmission structure according to claim 6, wherein the carrier is connected to the engine and the sun gear is connected to the first motor generator, and wherein when the overdrive is in operation, only the engine is output through the planetary gear part.

9. The transmission structure according to claim 6, wherein a torque blocking part is provided to a shaft connecting the engine and the carrier to each other.

10. The transmission structure according to claim 9, wherein the torque blocking part comprises one of a one-way clutch, a two-way clutch, or a brake.

* * * * *